US005603042A

United States Patent [19]
Kabenjian

[11] Patent Number: 5,603,042
[45] Date of Patent: Feb. 11, 1997

[54] PIPELINED DATA ORDERING SYSTEM UTILIZING STATE MACHINES TO DATA REQUESTS

[75] Inventor: Gregory V. Kabenjian, Duarte, Calif.

[73] Assignee: AST Research, Inc., Irvine, Calif.

[21] Appl. No.: 357,132

[22] Filed: Dec. 15, 1994

Related U.S. Application Data

[63] Continuation of Ser. No. 981,806, Nov. 25, 1992, abandoned.

[51] Int. Cl.⁶ .................................................. G06F 13/00
[52] U.S. Cl. .................. 395/800; 364/231.8; 364/238.4; 364/260; 364/DIG. 1
[58] Field of Search ............................. 395/800, 200.15, 395/840, 841, 834, 286, 311, 871, 496

[56] References Cited

U.S. PATENT DOCUMENTS

| | | | |
|---|---|---|---|
| 4,181,974 | 1/1980 | Lemay et al. | 395/200 |
| 4,661,905 | 4/1987 | Bomba et al. | 364/DIG. 1 |
| 4,858,234 | 8/1989 | Hartwell et al. | 371/14 |
| 4,864,496 | 9/1989 | Triolo et al. | 364/DIG. 1 |
| 4,937,733 | 6/1990 | Gillett, Jr. et al. | 364/DIG. 1 |
| 4,987,529 | 1/1991 | Craft, et al. | 364/DIG. 1 |
| 5,239,661 | 8/1993 | Ando et al. | 395/800 |
| 5,289,584 | 2/1994 | Thome et al. | 395/325 |
| 5,471,638 | 11/1995 | Keeley | 395/800 |

Primary Examiner—Alpesh M. Shah
Attorney, Agent, or Firm—Knobbe, Martens, Olson, & Bear

[57] ABSTRACT

A data ordering system for use with personal computers having data pipelining capability is disclosed. The personal computer comprises a central processing unit (CPU) which issues data requests to one or more data exchange units, such as memory units or data Input/Output units. The data ordering system comprises a finite state machine (FSM) which receives inputs indicative of data requests transmitted by a central processing unit (CPU). The inputs cause the FSM to assume different output states which are indicative of the proper order of data requests. The state outputs of the FSM are used to enable or disable the transmission of data between the data exchange units and the CPU in order to insure the proper order of data responses to the issued data requests.

2 Claims, 4 Drawing Sheets

PIPELINED DATA ORDERING SYSTEM UTILIZING STATE MACHINES TO DATA REQUESTS

This application is a continuation of application Ser. No. 07/981,806, filed Nov. 25, 1992, now abandoned.

BACKGROUND OF THE INVENTION

1. Field of the Invention

The present invention relates to devices which order cycled data in pipeline data systems, and, more particularly to devices which order cycled data in PC's having data pipeline capacity.

2. Description of the Related Art

Many personal computer systems developed in the past have included a central processing unit (CPU) which issues commands to other system components (e.g., memory storage devices, input/output units, etc.) and processes data received from these components. Typically, the CPU issues a single command, or request, to one of the system components, for example, the memory, and waits for the component to respond to this command. Once the memory has issued a response, the CPU is free to issue another command which may go to the same component or to another system component. Thus, in these systems, only a single command is pending at any one time so that the CPU must wait while the designated system component generates a response to the issued command.

In an effort to increase the efficiency and processing capacity of personal computers, a new generation of data pipelining computers, such as the Intel®PENTIUM processor, has been developed. Data pipelining systems allow more than one request to be transmitted at a time so that at any given time two or more command requests may be pending. Personal computer systems that include such pipelining capability are able to issue a first command and subsequently issue a second command before receiving a response to the first command.

One problem associated with data pipelining in personal computers is the managing of data requests and responses. For example, if the CPU issues a first command to a relatively slow memory unit and the CPU then issues a second command to a faster memory unit before a response is received from the first memory unit, then it is possible that the second, faster memory unit will issue a response before the first memory unit issues a response. The CPU will therefore receive the responses in a reverse order so that the second response will be given to the first command, while the first response will be given to the second command.

Therefore, a need exists for a data management system which orders the issuance of data responses so that the correct responses are always given to the corresponding CPU commands.

SUMMARY OF THE INVENTION

One aspect of the present invention is a data management system which manages data in a personal computer data pipelining system. The pipelining system includes a central processing unit (CPU), a data communications bus, and a plurality of data generation devices. The pipelining system explained below is configured so that at most two data requests may be issued by the CPU prior to the reception of a response from a data generation device; however, the present invention may be expanded to handle a larger number of requests. The data management system comprises select circuitry associated with each data generation device. The select circuitry receives data requests from the CPU and outputs a select signal when a data request is directed to the data generation device. A state machine is associated with each data generation device. The state machine receives the select signal from the select circuitry associated with its associated data generation device and receives a select signals from select circuitry associated with other data generation devices. The state machine activates its associated data generation device to output data to the data communications bus when an active select signal from the select circuitry associated with its associated data generation device occurs prior to an active select signal from the select circuitry in another data generation device.

Another aspect of the present invention is an apparatus that controls the order in which devices respond to data requests in a pipelined data system. The apparatus comprises a decoder associated with each device. The decoder determines whether a current data request is intended for its associated device and generates an active decode signal when the current data request is intended for its associated device. A state machine is associated with each device. The state machine receives the active decode signal from the decoder associated with its associated device and also receives active decode signals from decoders associated with other devices. The state machine further receives an end of cycle signal indicating completion of prior data requests. The state machine generates an active select signal when the state machine determines that the active decode signal from the decoder associated with its associated device is the current earliest active decode signal. The device is responsive to the active select signal to output data to the pipelined data system.

A still further aspect of the present invention is a pipelined data system comprising a first data generating device, a second data generating device, and a first device that issues requests for data from the first and second data generating devices. The first device issues a first request for data and issues a second request for data without waiting for a response to the first request for data. The system includes a first decoder and a first controller associated with the first data generating device, and further includes a second decoder and a second controller associated with the second data generating device. The first decoder determines when either of the first and second requests are intended for the first data generating device and generates a first active select signal for each request intended for the first data generating device. The second decoder determines when either of the first and second requests are intended for the second data generating device and generates a second active select signal for each request intended for the second data generating device. The first controller responds to the active select signals from the first and second decoders to cause the first data generating device to provide data to the pipelined data system when the first active select signal occurs before any second active select signal to which the second data generating device has not responded. The second controller responds to the active select signals from the first and second decoders to cause the second data generating device to provide data to the pipelined data system when the second active select signal occurs before any first active select signal to which the first data generating device has not responded.

DETAILED DESCRIPTION OF THE INVENTION

Figure 1:
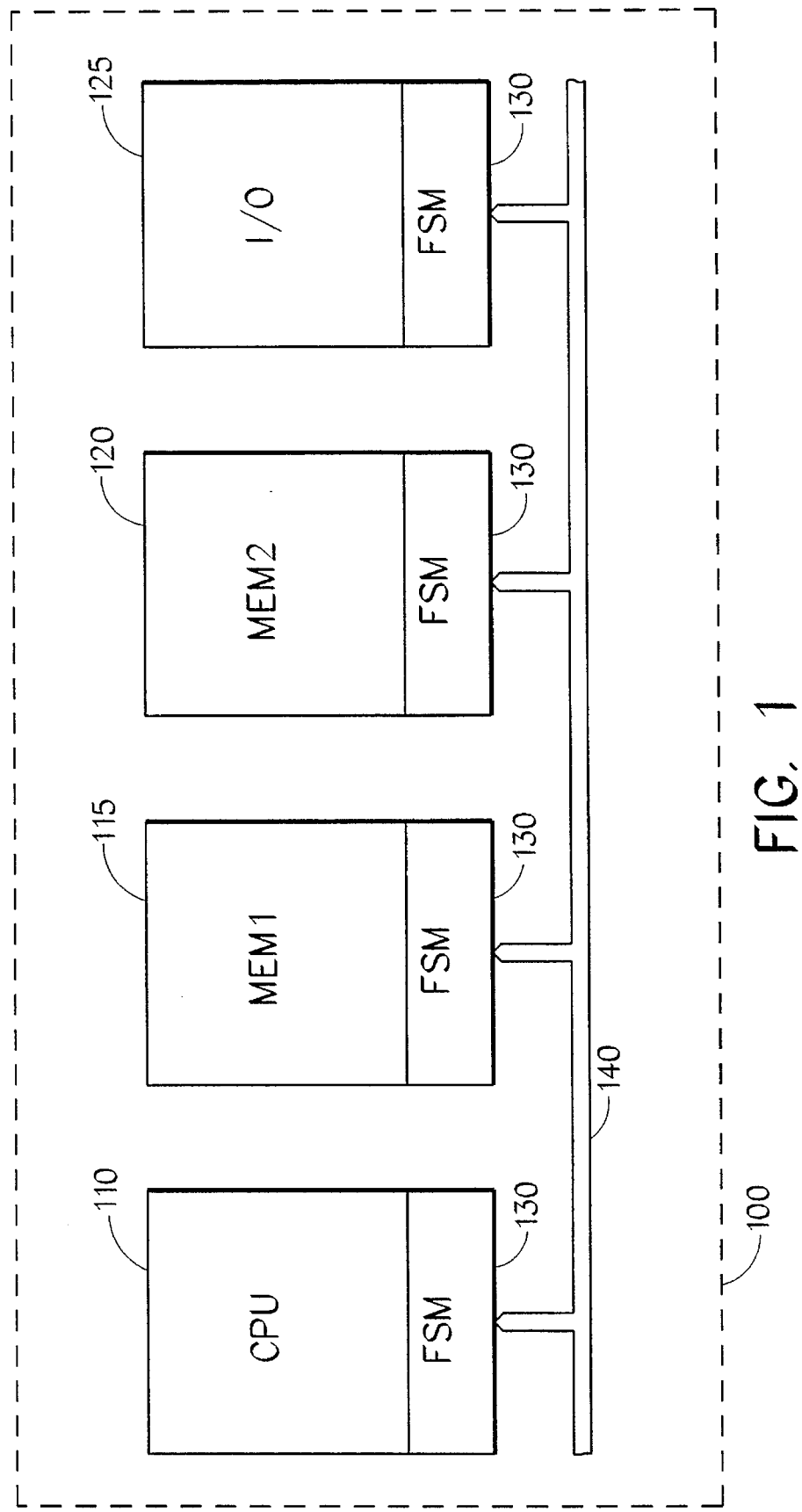
FIG. 1 is a schematic block diagram which shows major internal functional elements of a personal computer system.

FIG. 1 is a schematic block diagram which shows major internal functional elements of a personal computer system 100 (generally designated by the dashed lines). The personal computer system 100 includes data pipelining capability and, in one embodiment, is advantageously an AST PENTIUM-based computer. The computer system 100 has a number of internal data generation units including a central processing unit (CPU) 110, a first memory unit (MEM1) 115 and a second memory unit (MEM2) 120, and an input/output (I/O) unit 125. The CPU 110 may, for example, be an INTEL® PENTIUM microprocessor chip. The first and second memory units 115, 120 may be a memory array based upon DRAM Model No. MT18D236 available from MICRON, and the I/O unit 125 may be a magnetic disc memory (i.e., hard disc drive), for example.

The CPU 110, the memory units 115, 120, and the Input/Output unit 125 all include finite state machines (FSM's) 130. The CPU 110, the memory units 115, 120, and the I/O unit 125 communicate via a bus 140 which may include address, data, and control busses (shown more clearly in FIG. 2).

Figure 2:
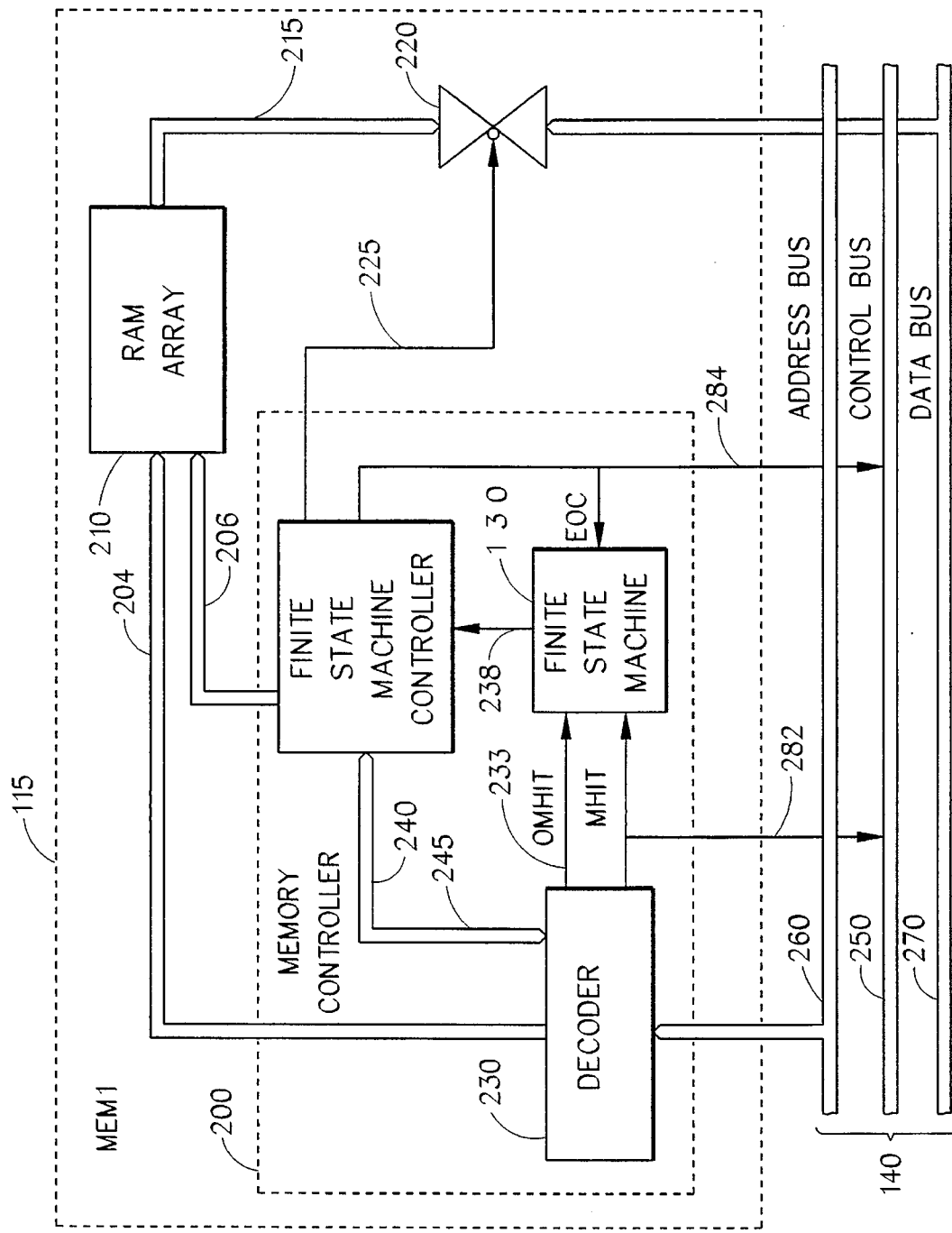
FIG. 2 is a simplified schematic block diagram showing each of the main internal functional elements of the memory unit of FIG. 1.

FIG. 2 is a simplified schematic block diagram showing each of the main internal functional elements of the memory unit 115 of FIG. 1. It should be understood that the depiction of the memory unit 115 is exemplary and is primarily included to illustrate the structure and operation of the pipelined data ordering system of the present invention. Thus, although the structure and operation of the data ordering system will only be described with reference to the memory unit 115, it will be appreciated by one of ordinary skill in the art that the implementation of the data ordering system as described with reference to the memory unit 115 may be effected in essentially the same manner for any of the other components which exchange data (e.g., the CPU 110, the I/O unit 125, etc.).

The memory unit 115 includes a memory controller 200 which communicates with a random access memory (RAM) array 210 via buses 204, 206. The RAM 210 further connects to a set of transceivers 220 via a bus 215. The transceivers 215 are also connected to the memory controller 200 via a line 225.

The memory controller 200 includes an address decoder 230 which communicates with the FSM 130 via an OMHIT line 233. The FSM 130 communicates with a finite state machine controller 240 via a communication line 238. The FSM controller 240 and the decoder 230 also communicate via a bidirectional bus 245. The decoder communicates an address to the RAM array 210 via the bus 204, while the FSM controller 240 communicates with the RAM array 210 and the transceiver 220 via the bus 206 and the line 225, respectively. The decoder 230, the FSM 130, and the FSM controller 240, as well as other support circuitry (not shown), are preferably implemented within a single integrated circuit.

A control bus 250 communicates with the decoder 230, the FSM 130, and the FSM controller 240 so as to provide control signal inputs. An address bus 260 communicates with the decoder 230 to provide an input data address. The RAM array 210 outputs data to a data bus 270 via the bus 215 and the transceivers 220.

The memory unit 115 operates by receiving address and control signals via the address bus 260 and the control bus 250, and outputting data on the bus 270 in response to these address and control signals. Initially, a data address is transmitted via the address bus 260 and is applied to the input of the decoder 230. The decoder 230 determines if the applied address corresponds to a data memory location within the RAM array 210. If the applied address does not correspond to a memory location within the RAM 210, then the decoder 230 ignores the applied address and the memory unit 115 remains inactive. However, if the applied address corresponds to a data memory location within the RAM array 210, then the decoder 230 generates a local "mine" signal, OMHIT. OMHIT is a local signal which indicates that the address on the address bus 260 belongs to the memory unit 115 and not to any other data exchange devices. The decoder 230 transmits the OMHIT signal to the FSM 130 via the line 233. The FSM 130 responds by selectively generating a signal to the FSM controller 240 via the line 238, as discussed below. The FSM controller 240 responds by initiating access to the RAM array 210 if the local memory associated with the FSM controller is addressed and the current oldest request is directed to the local memory. The decoder 230 also provides the "mine" signal as an output to the control bus 250 via a line 282 where it is ORed with "mine" signals from the decoders in the other data generation units to generate a global "mine" signal "MHIT." The MHIT signal from the decoder 230 and from the decoders in the other data generation units is provided as an input to the FSM 130.

Because the RAM array 210 is typically constructed to be accessible via a row address input and a column address input, the FSM controller 240 instructs the decoder 230 to transmit the row address input first and the column address input next via the bus 204. It will be understood by one skilled in the art that the decoder 230 includes storing and multiplexing capabilities (not shown) for storing an incoming address and routing the proper address to the RAM array 210 when the RAM array is activated. The FSM controller 240 also transmits signals to the RAM array 210 via the bus 206 to indicate whether the incoming address is a column or a row address. Once the decoder 230 addresses a selected memory location within the RAM array 210, the RAM array 210 outputs the data stored in the accessed memory location via the bus 215. The data is applied to the inputs of the transceivers 220 and subsequently passes to the data bus 270 when the transceiver 220 is enabled. The data from the RAM array 210 then passes to the CPU 110 for processing. The FSM controller 240 generates an active end of cycle (EOC) signal on a line 284 when the cycle is completed. The EOC signal is ORed with the EOC signals from the FSM controllers in the other data generation units via the control bus 250.

The FSM controller 240 enables or disables the transceiver 220 via the line 225. The FSM controller 240 enables the transceivers 220 when the FSM 130 provides the appropriate enable signal to the FSM controller 240. The FSM 130, the FSM controller 240, and the transceivers 220 effectively act as a selective delay circuit which prevents the misordering of data in a data pipelining system such as described herein. That is, the FSM 130, the FSM controller 240, and the transceivers 220 prevent the transmission of data from the memory unit 115 until any previous data requests from the CPU have been responded to. The method of ordering pipelined data requests as will be discussed in greater detail below with reference to the state diagram of FIGS. 3A and 3B.

Figure 3A:
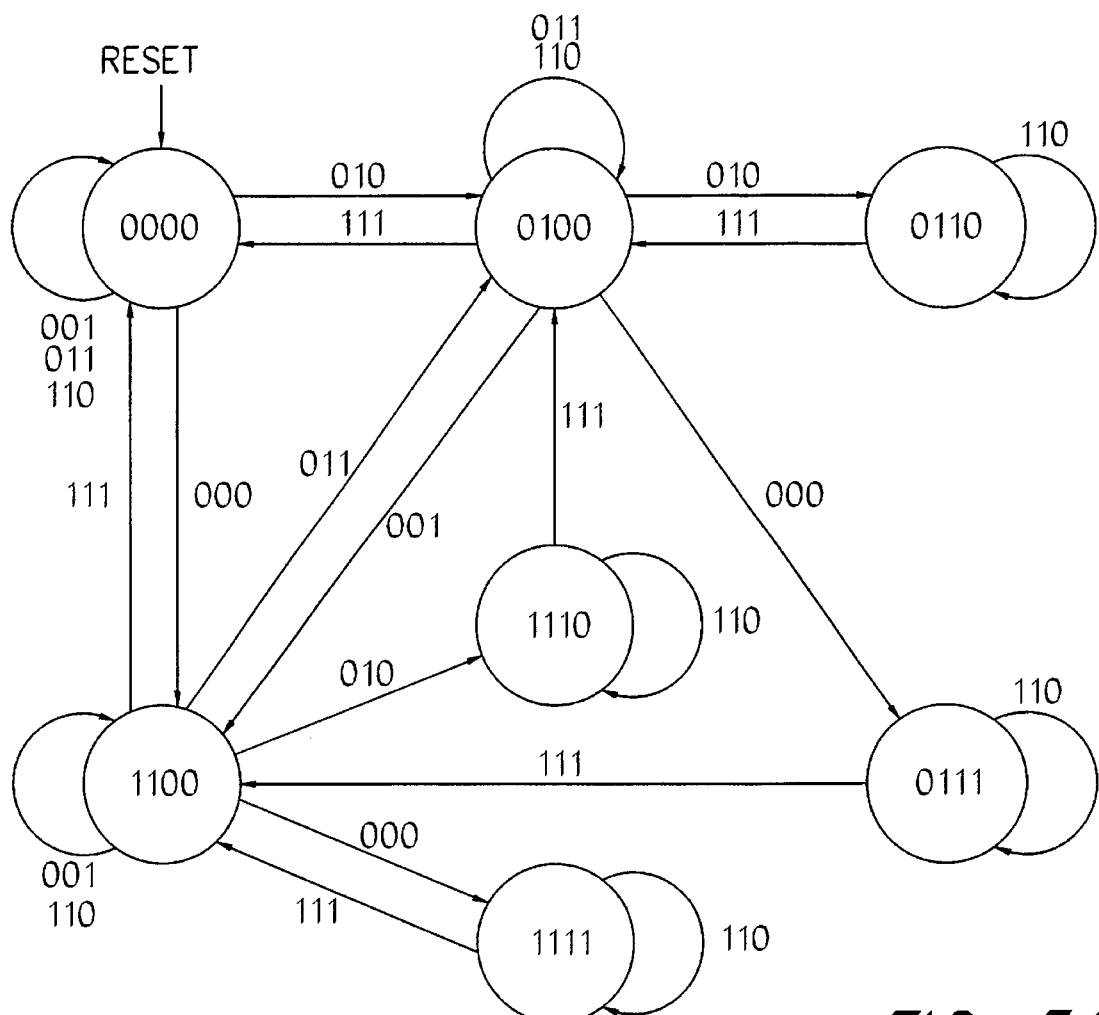
FIG. 3A is a state diagram which shows the states of the finite state machine (FSM), and the effects of the various inputs to cause the FSM to transition to another state.
Figure 3B:
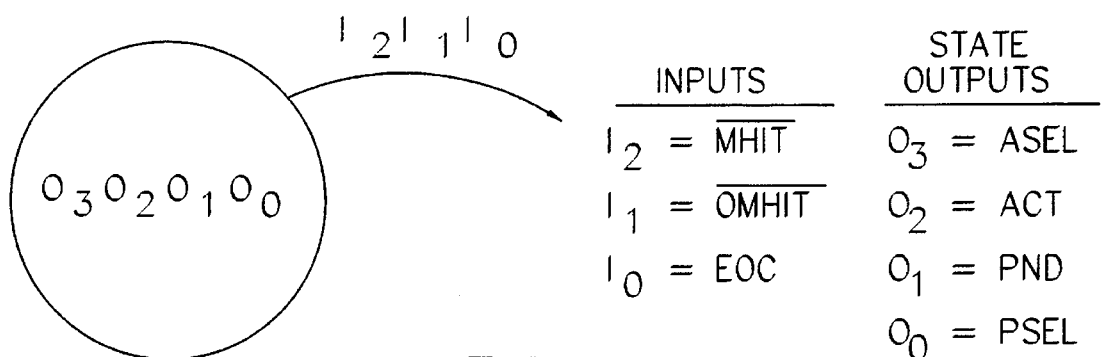
FIG. 3B hows an exemplary state bubble and transition path having generalized bubble output states and transition path input bits.

FIG. 3A is a state diagram of one of the FSM's 130 which, in conjunction with FIG. 3B, shows the states of the FSM 130, and the effects of the various inputs to cause the FSM 130 to transition to another state. The primary function of the FSM's 130 is to prevent the misordering of pipelined data. Thus, the conditions which correspond to each of the states constitute a procedure for preventing the misordering of pipelined data. The FSM 130 receives control inputs from the CPU 110 and the other data exchange units (e.g., the memory unit 120, the I/O unit 125, etc.). The input signals indicate the status of the CPU data requests and responses by the other data exchange units. In one preferred embodiment, the FSM 130 receives three input bits, $I_0$, $I_1$, and $I_2$ (FIG. 3B) which indicate the status of the CPU data requests and the responses by the other data exchange units. The input bit $I_0$ represents the value of the end-of-cycle (EOC) signal (that is, the system-wide signal which indicates that a data cycle has completed by the currently active unit). The input bit $I_1$ represents the value of the local "mine" signal OMHIT (i.e., the local signal within a data exchange unit which indicates that a given data request belongs to that unit). Thus, in the FSM 130 of the memory unit 115, the bit $I_1$ represents the value of the local OMHIT signal generated by the decoder 230 on the line 233. The input bit $I_2$ represents the value of a global "mine" signal MHIT which indicates that any one of the data exchange units has received a data request. The MHIT signal may, for example, be generated by taking the output of an OR gate (not shown) having OMHIT signals from each of the data exchange units as inputs. Thus, the value of the bit $I_2$ will be the same within all of the FSM's (i.e., the FSM in the CPU 110, the FSM in the memory unit 115, etc.). It should be noted that, in the embodiment described herein, the input bits $I_1$ and $I_2$ are active low. Stated briefly, therefore, the input bits $I_2$, $I_1$, and $I_0$, indicate to each FSM 130 whether a data request has been received by any of the data exchange units, whether a data request has been directed to that particular unit, and whether a data cycle has completed.

In response to the input bits $I_0$, $I_1$, and $I_2$, four state outputs $O_0$, $O_1$, $O_2$, and $O_3$, of the FSM 130 change as indicated in the state diagram of FIG. 3A. The state output bits represent the state of active and pending requests within the system 100. An active request is a data request for which the CPU 110 is currently awaiting a response, while a pending request is the data request issued by the CPU 110 subsequent to issuance of the active request and prior to the response to the active request.

FIG. 3B provides a summary of each of the state variables of the FSM 130. The state output bit $O_0$ represents the value of the variable PSEL. The variable PSEL is a local variable within each memory exchange unit which indicates whether or not that memory exchange unit is the owner of a pending request. The state output bit $O_1$ represents the value of the variable PND. The variable PND is a global variable common to all of the FSM's 130 which indicates whether or not a pending data request has been initiated within any one of the data exchange units. The state output bit $O_2$ represents the value of a variable ACT. The variable ACT is also a global variable common to all of the data exchange units and indicates whether or not an active data request has been initiated in any one of the data exchange units. The state output bit $O_3$ represents the value of a variable ASEL. The variable ASEL is a local variable within each data exchange unit's FSM 130 that indicates whether or not that data request unit is the owner of the active data request. These four state output bits ($O_0$, $O_1$, $O_2$, and $O_3$) constitute the state of each FSM 130, and are represented within the state bubbles, while the input bits ($I_0$, $I_1$, and $I_2$) are represented along the paths between state bubbles in the state diagram 3A.

It should be noted here that, although there are 16 possible combinations which the state output bits may assume, and eight possible combinations which the input bits may assume, not all of these possibilities are represented within the state diagram 3A since many of these combinations are not valid, and therefore will not be entered during normal operation of the system 100. In particular, those output state values which would indicate that there is a pending request without an active request (i.e., states 0001, 0010, and 0011) are invalid. Similarly, those states which would indicate that a particular active request or a particular pending request belongs to the data exchange unit of the local FSM 130 while no global active or pending requests are indicated (i.e., states 0001, 0101, 1000, 1001, 1010, 1011, and 1101) are likewise invalid because a local request automatically generates a global request. For the case of the input bits, the states 100 and 101 (recalling that the first two bits $I_2$ and $I_1$ are active low) are invalid since these states would indicate that a local data request has been made but no global request was indicated.

The system 100 generally begins operation in the state 0000. The system 100 may arrive at the state 0000 by means of a system reset, or by transition from another state. The state 0000 indicates the condition where there are no outstanding data requests from the CPU 110. This state generally indicates that the CPU 110 is processing data or the system 100 is inactive. Within the state 0000 certain input bit combinations are impossible during normal operation of the system 100. Namely, the input state 111, indicating an EOC but no data requests, is impossible since there are no active data requests, and, consequently, there can be no end-of-cycle. The FSM 130 will remain in the state 0000 until the input bits to the FSM 130 indicate that a data request without an EOC has been issued from the CPU 110. Thus, as indicated in the state diagram, the FSM 130 will remain in the state 0000 for inputs of 001 (local data request simultaneous with EOC), 011 (global data request simultaneous with EOC), and 110 (no data requests and no EOC). However, an input of 010 (global data request with no EOC) or an input of 000 (local and global data request without an EOC) will cause the FSM 130 to change state.

An input of 000 causes the FSM 130 to transition to the state 1100. The state 1100 indicates that a data request to the local data exchange unit (i.e., the unit which includes the FSM 130 whose states are depicted in the state diagram of FIG. 3A) is active and that there are no pending data requests within the system. An input of 010 causes the FSM 130 to transition to state 0100. The state 0100 indicates that a data request to another data exchange unit is active and that there are no pending data requests within the system 100.

When in the state 0100, the FSM 130 may transition to any one of four different states, or may remain in the same state depending upon the input bit combination. For example, if the input bits are 110 (no new data requests from the CPU 110 and no EOC) or 011 (global data request simultaneous with an EOC), then the FSM 130 remains in the state 0100. The reason the FSM 130 remains in the state 0100 when a global request is issued simultaneously with an EOC is that as soon as the old active data request is cleared by the EOC, it is replaced by a new global active request immediately thereafter so that the FSM 130 never actually leaves the state 0100.

An input bit combination of 111 (no new data requests with an EOC) while the FSM 130 is in the state 0100 indicates the absence of any active data requests, and the FSM 130 transitions back to the state 0000.

An input bit combination of 010 (global data request without an EOC) while the FSM 130 is in the state 0100 causes the FSM 130 to transition to state 0110. The state 0110 indicates that an active and a pending data request have been made to other data exchange units. Thus, the CPU 110 is currently waiting for two responses. Since, in the embodiment described herein, the system 100 is only able to handle two outstanding requests at once, all input bit combinations which indicate that a new data request has been issued by the CPU 110 (i.e., input bit combinations 000, 001, 010, 011) are invalid while the FSM 130 is in the state 0110. Thus, if the input bit combination is 110 (no new data requests and no EOC), then the FSM 130 will remain in the state 0110, but if the input bit combination is 111 (no new data requests and an EOC) then this input causes the FSM to transition back to the state 0100.

An input bit combination of 001 (local data request simultaneous with an EOC) while the FSM 130 is in the state 0100 indicates that the global active request has been cleared and replaced by a new local data request. Thus, the FSM 130 transitions to state 1100 which indicates that the active data request has been issued to the local data exchange unit. The state 1100 will be discussed in more detail below.

An input bit combination of 000 (local data request without an EOC) while the FSM 130 is in the state 0100 causes the FSM 130 to transition to a state 0111. The state 0111 indicates that the active data request belongs to some other data exchange unit while the pending request belongs to the local data exchange unit. As was the case with the state 0110, the inputs which indicate the issuance of new data requests from the CPU 110 are invalid while the FSM 130 remains in the state 0111 because two data requests are already pending and the processor will not issue a third data request. Thus, when the input bits are 110 (no new data and no EOC), the FSM 130 remains in the state 0111. However, an input bit combination of 111 (no new data and an EOC) indicates that the active request is cleared. The pending request therefore becomes active so that the FSM 130 transitions to the state 1100.

While the FSM 130 is in the state 1100 (indicating that the active data request belongs to the local data exchange unit while there is no pending request), the FSM 130 may transition to one of four different states, or remain in the state 1100 as determined by the input bit combination. If the input bits are 110 (no new data requests and no EOC), then the FSM 130 remains in the state 1100. Similarly, if the input bits are 001 (a local data request simultaneous with an EOC) the FSM 130 will likewise remain in the state 1100 since the EOC will clear the old, local active data request and a new, local active data request will immediately replace the previous request.

If the input bits are 011 (global data request with an EOC) while the FSM 130 is in the state 1100, the FSM 130 will transition to the state 0100 because the EOC clears the previous local active data request, and the new global data request issued by the CPU 110 replaces the previous request. Thus, the FSM 130 enters a state which indicates that a global, active request is outstanding (i.e., the state 0100).

An input bit combination of 111 (no new data requests and an EOC) while the FSM is in the state 1100 indicates that the active request is cleared and that no new request has replaced the active request. Thus, the FSM 130 enters the state 0000 indicating that no data requests are outstanding.

If the input bits are 000 (new local data request without an EOC) while the FSM 130 is in the state 1100, the FSM 130 transitions to the state 1111. The state 1111 indicates that an active and a pending data request are outstanding and that both the active and pending data requests belong to the local data exchange unit. Because there is an active and a pending data request outstanding at the same time, the input combinations which indicate that a new data request has been issued by the CPU 110 are invalid while the FSM 130 is in the state 1111. Thus, the input bits may only assume two combination, 110 and 111. If the input bits are 110 (no new data requests and no EOC), the FSM will remain in the same state (i.e., the state 1111). However, if the input bits are 111 (no new data requests with an EOC), the active request will be cleared and the pending local request will be made active. Therefore, the FSM 130 transitions back to the state 1100 (indicating an active local data request but no pending data request).

If the input bits are 010 (global data request without an EOC) while the FSM 130 is in the state 1100, the FSM 130 transitions to a state 1110. The state 1110 indicates that there is an active local data request and a pending global data request. Thus, the state 1110 excludes the possibility of any inputs which indicate that a new data request has been issued by the CPU 110. Therefore, if the input bit combination is 110 (no new data requests with no EOC), then the FSM remains in the state 1110, however, if the input bit combination is 111 (no new data requests with an EOC), then the active local request is cleared and the pending global request becomes an active global request. Thus, the FSM 130 transitions to the state 0100, indicating that a global active data request is outstanding within the system 100.

In the above-described manner, each of the FSM's 130 transition from state to state in response to given inputs. The output state of each of the FSM's 130 is therefore indicative of the status of data requests throughout the system 100. Because each FSM 130 has an output state that is indicative of the status of data requests throughout the system 100, signals provided by the FSM's 130 are able to insure the proper ordering of data within the system 100 as will be made more clear below.

Figure 4:
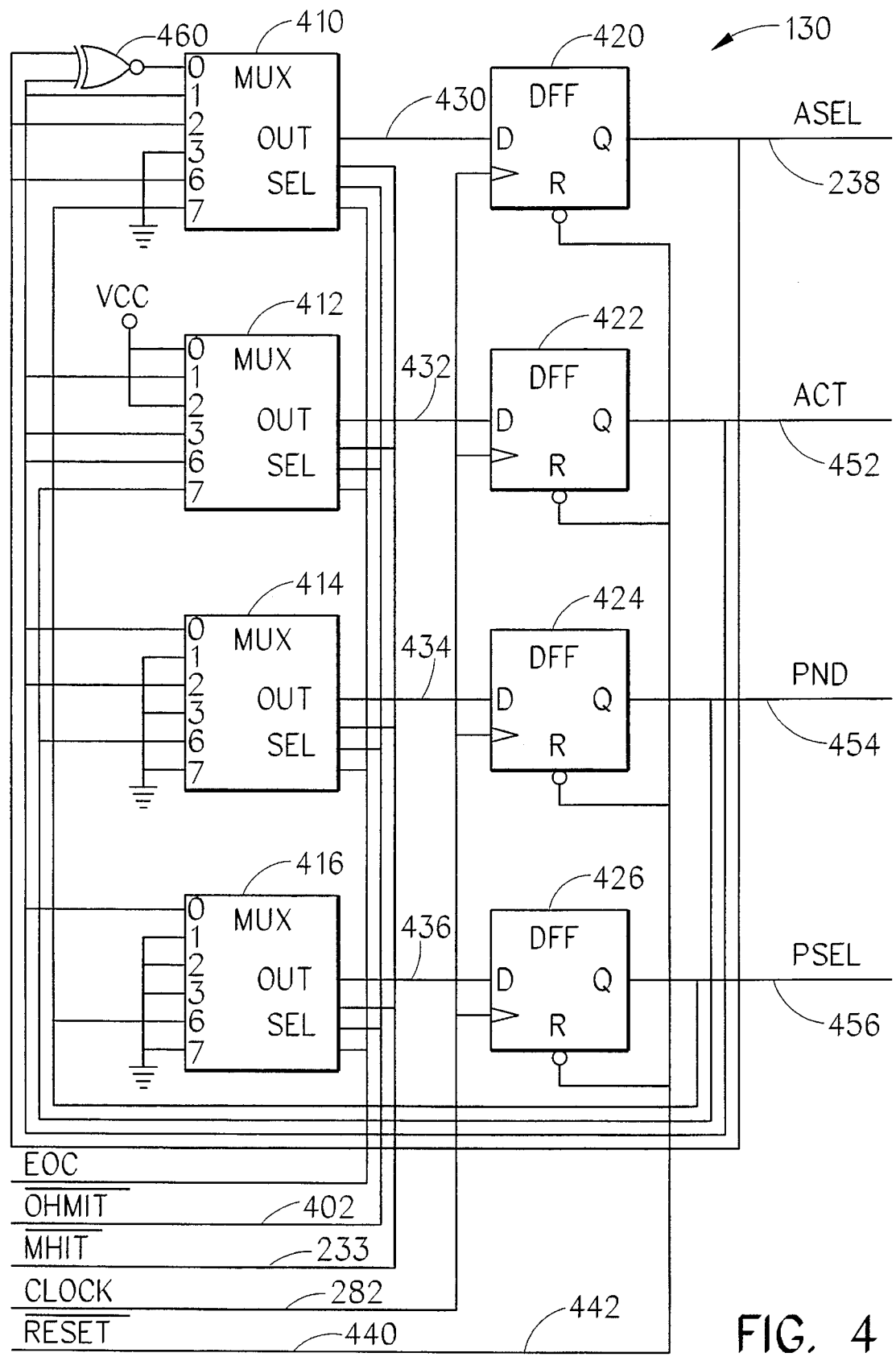
FIG. 4 is a schematic block diagram showing one preferred implementation of the FSMs.

FIG. 4 is a schematic block diagram showing one preferred implementation of the FSM's 130. It should be noted that, although the implementation of the FSM 130 is shown in FIG. 4 as though the FSM 130 comprises a plurality of separate components, the FSM 130 may be implemented within a single integrated circuit chip. As shown in FIG. 4, the FSM 130 comprises four 8×1 multiplexers (MUX) 410, 412, 414, and 416 which receive the input bits $I_0$ (EOC), $I_1$(OMHIT), $I_2$ (MHIT) as select inputs along the lines 402, 233, 282 respectively.

The multiplexers 410–416 pass signals to four D Flip-Flops (DFF) 420–426, respectively, along the lines 430–436. The signals passed by the multiplexers 410–416 are determined by the value of the input bits applied along the lines 402, 233, 282. For example, if the input bits $I_0$–$I_2$ are 011, then the signal applied to the "3" input of each multiplexer 410–416 will be passed to the output of that multiplexer, and is therefore applied to the input of the corresponding D Flip-Flop 420–426. It will be appreciated that the "4" and "5" inputs to the multiplexers 410–416 are not connected since these inputs are never selected (i.e., because the inputs 100 and 101 are not valid input combinations).

The D Flip-Flops 420–426 pass data applied at their inputs to their outputs on the occurrence of a clock cycle on a line 440. Each D Flip-Flop 420–426 also includes an active low reset input connected to a line 442. Thus, the output of each of the Flip-Flops 420–426 will reset to low upon the application of a logical "0" to the line 442. The outputs of the Flip-Flops 420–426 are applied to output lines 238, 452, 454, 456 respectively.

The signals present on the lines 238, 452, 454, 456 constitute the state outputs of the FSM 130. In particular, the signal on the line 238 is the variable ASEL, the signal on the line 452 is the variable ACT, the signal on the line 454 is the variable PND, and the signal on the line 456 is the variable PSEL.

Each of these signals is fed back to one or more of the inputs to the multiplexers 410–416. In particular, the signal ASEL (indicating that there is an active data request which belongs to the local data exchange unit) on the line 238 is fed back to inputs 2 and 6 of the multiplexer 410, as well as to the first input of an exclusive-NOR (XNOR) gate 460. The signal ACT (indicating that there is an active data request which belongs to a data exchange unit other than the local data exchange unit) on the line 452 is fed back to inputs 1, 3, and 6 of the multiplexer 412, inputs 0 and 2 of the multiplexer 414, and input 0 of the multiplexer 416. The signal ACT is also applied to the second input of the XNOR gate 460. The output of the XNOR gate 460 is applied to input 0 of the multiplexer 410. The signal PND (indicating a pending data request which does not belong to the local data exchange unit) on the line 454 is fed back to input 7 of the multiplexer 412 and input 6 of the multiplexer 414. Finally, the signal PSEL (indicating that there is a pending data request which belongs to the local data exchange unit) on the line 456 is fed back to input 7 of the multiplexer 410 and input 6 of the multiplexer 416.

Input 3 of multiplexer 410, inputs 1, 3, and 7 of multiplexer 414, and inputs 1, 2, 3, and 7 of multiplexer 416 are connected directly to ground (i.e., a logical zero or low voltage level). Inputs 0 and 2 of multiplexer 412 are connected directly to Vcc (high). Thus, each of the selectable (i.e., valid) multiplexer inputs is connected to a feedback input, ground, or Vcc.

During normal operation, a FSM circuit constructed as shown in FIG. 4 will provide a set of four state outputs in response to three input bits. The transition from output state to output state of the circuit shown in FIG. 4, as dictated by the value of the input bits, exactly corresponds to the transition of states depicted in the state diagram of FIG. 3A. An input/output example will be given below to manifest the operation of the FSM circuit shown in FIG. 4.

Given, for example, an output state of 0000 and input bits of 010 (i.e., $I_0=0$, $I_1=1$, and $I_2=0$), it is clear that the signals on each of the lines 238, 452, 454, 456 will be logical 0, while the selected multiplexer inputs will be input 2 for each of the multiplexers 410–416. Thus, the signal applied to line 430 at the output of multiplexer 410 will be equal to the signal applied to the line 238 (in this case a logical 0 since ASEL is given as 0). The signal applied to the line 432 at the output of the multiplexer 412 will be equal to Vcc (i.e., a logical 1). The signal applied to the line 434 at the output of the multiplexer 414 will be equal to the signal applied to the line 454 (in this case a logical 0 since ACT is given as 0). Finally, the signal applied to the line 436 at the output of the multiplexer 416 will be equal to ground (i.e., logical 0). Each of the outputs of the multiplexers 410–416 are applied to the inputs of the corresponding D Flip-Flops 420–426 so that these signals are passed to the output lines 238, 452, 454, 456 respectively upon the occurrence of a clock pulse. Thus, the next output state will be ASEL=0, ACT=1, PND=0, and PSEL=0, that is, 0100. This corresponds to the state transition from 0000 to 0100 when an input of 010 is applied as depicted in the state diagram of FIG. 3A.

As stated above, the FSM 130, along with the FSM controller 240 and the transceiver 220 (FIG. 2), act as a selective delay circuit which delays the transmission of data from the RAM array 210 to the data bus 270 until the pending data request to the memory unit 115 has become active. This delay is accomplished by means of an enable signal provided by the FSM 130 to the FSM controller 240 along the line 238. When the signal on the line 238 is low, this indicates to the FSM controller 240 that data should not be transmitted. The FSM controller 240 therefore sends a disable signal to the transceiver 220 along the line 225 which prevents the transmission of data from the RAM 210 to the data bus 270. Once the pending local data request becomes active (e.g., when the data request is active and belongs to the memory unit 115), then this means that the requested data should be transmitted from the RAM array 210 to the data bus 270. The FSM 130 therefore generates an enable signal along the line 238 which tells the FSM controller 240 to enable the transceiver 220.

As shown in FIG. 4, the enable signal along the line 238 is generated at the output of the D Flip-Flop 420 as the signal ASEL. The ASEL signal is only high when the data request is active and local so that the use of ASEL as an enable signal insures that the memory unit 115 will not output data until the a response has been made to the prior data request from the CPU 110.

The invention may be embodied in other forms without departing from its spirit or essential characteristics. For example, the FSM 130 may be implemented within several different circuit elements or within a single integrated circuit chip. Furthermore, the FSM 130 may be implemented using different circuit components such as shift registers. In addition, the construction of the FSM 130 may be expanded and modified to accommodate data pipelining where 3 or more CPU data requests are outstanding at once. Therefore, the foregoing description should be considered as illustrative and not restrictive. The spirit and scope of the invention should instead be understood in view of and defined by the appended claims.

What is claimed is:

1. An apparatus that controls the order in which devices respond to data requests in a pipelined data system, said apparatus comprising:

a plurality of decoders, each of said plurality of decoders responsive to a current data request being intended for a corresponding one of said devices to generate an active local decode signal, and a plurality of state machines, each of said state machines coupled to a corresponding one of said devices and to a corresponding one of said plurality of decoders, each of said plurality of state machines connected to receive an active global decode signal indicating that a local decode signal has been activated by any of said plurality of decoders, each of said plurality of state machines further connected to receive an end of cycle signal indicating completion of prior data requests, each of said plurality of state machines generating an active select signal when the active local decode signal from said corresponding decoder is a current earliest active local decode signal, said corresponding device responsive to said active select signal to output data to said pipelined data system, wherein each of said plurality of state machines generates a first state signal that is active when said corresponding device has an active data request which occurred before any other active data request, a second state signal that is active when said corresponding device has an active data request which occurred after another active data request, a third state signal that is active when any one of said devices has an active data request, and a fourth state signal that is active when any two data requests are active.

2. A pipelined data system comprising:

a first data generating device;

a second data generating device;

a first device that issues requests for data from said first and second data generating devices, said first device issuing a first request for data and issuing a second request for data without waiting for a response to said first request for data, said first device requiring a response to said first request for data prior to a response to said second request for data;

a first decoder coupled to said first device;

a second decoder coupled to said first device;

a first controller coupled to said first and second decoders and to said first data generating device; and a second controller coupled to said first and second decoders and to said second data generating device, wherein:

said first decoder determines when either of said first and second requests are intended for said first data generating device and generates a first active select signal for each request intended for said first data generating device;

said second decoder determines when either of said first and second requests are intended for said second data generating device and generates a second active select signal for each request intended for said second data generating device;

said first controller is connected to receive said active select signals from said first and second decoders, and said first controller causes said first data generating device to provide data to said pipelined data system when said first active select signal occurs before any second active select signal to which the second data generating device has not responded; and said second controller is connected to receive said active select signals from said first and second decoders, and said second controller causes said second data generating device to provide data to said pipelined data system when said second active select signal occurs before any first active select signal to which the first data generating device has not responded.

\* \* \* \* \*

UNITED STATES PATENT AND TRADEMARK OFFICE
CERTIFICATE OF CORRECTION

PATENT NO. : 5,603,042
DATED : February 11, 1997
INVENTOR(S) : Gregory V. Kabenjian It is certified that error appears in the above-indentified patent and that said Letters Patent is hereby corrected as shown below:

On the title page, item [54], and column 1:

In the title, please change "Pipelined Data Ordering System Utilizing State Machines to Data Requests" to --Pipelined Data Ordering System Utilizing State Machines to Order Data Requests--

Signed and Sealed this

Twenty-sixth Day of August, 1997

Attest:

BRUCE LEHMAN

*Attesting Officer*            *Commissioner of Patents and Trademarks*